United States Patent [19]

Anton et al.

[11] Patent Number: 5,205,262
[45] Date of Patent: Apr. 27, 1993

[54] FUEL INJECTION PUMP FOR INTERNAL COMBUSTION ENGINES

[75] Inventors: Karle Anton, Leonberg; Pape Werner, Lyons, both of Fed. Rep. of Germany

[73] Assignee: Robert Bosch GmbH, Stuttgart, Fed. Rep. of Germany

[21] Appl. No.: 427,855

[22] PCT Filed: Jan. 21, 1989

[86] PCT No.: PCT/DE89/00032
§ 371 Date: Sep. 19, 1989
§ 102(e) Date: Sep. 19, 1989

[87] PCT Pub. No.: WO89/07708
PCT Pub. Date: Aug. 24, 1989

[30] Foreign Application Priority Data

Feb. 18, 1988 [DE] Fed. Rep. of Germany ....... 3805033

[51] Int. Cl.⁵ .................. F02M 51/00; F02M 37/04
[52] U.S. Cl. ................................ 123/494; 123/506; 123/449
[58] Field of Search ............. 123/506, 458, 494, 357, 123/358, 359, 449; 73/119 A

[56] References Cited

U.S. PATENT DOCUMENTS

| | | | |
|---|---|---|---|
| 4,244,342 | 1/1981 | Fenne | 123/446 |
| 4,462,361 | 7/1984 | Karle | 123/494 |
| 4,475,507 | 10/1984 | Miyaki | 123/357 |
| 4,576,129 | 3/1986 | Wallenfang | 123/357 |
| 4,603,669 | 8/1986 | Takemoto | 123/506 |
| 4,706,635 | 11/1987 | Draper | 123/506 |
| 4,788,960 | 12/1988 | Oshizawa | 123/357 |
| 4,790,277 | 12/1988 | Schechter | 123/357 |
| 4,870,939 | 10/1989 | Ishikawa | 123/506 |
| 4,884,549 | 12/1989 | Kelly | 123/506 |

Primary Examiner—Carl S. Miller
Attorney, Agent, or Firm—Michael J. Striker

[57] ABSTRACT

In a fuel injection pump system for internal combustion engines includes a fuel pump whose pump plunger (14) executes an axially reciprocating and rotating movement, and a switching valve (29) which is controlled by a computerized control device (34) and whose closing period determines the start of delivery and the desired delivery stroke of the pump plunger (14) which effects fuel injection. The desired delivery stroke is calculated by a control computer (35) of the control device (34) according to the instantaneous operating parameters of the internal combustion engine. A stroke transmitter (36) is provided for direction controlling the start of delivery and the end of delivery by means of the pump plunger stroke, the stroke transmitter (36) senses the stroke of the pump plunger (14) and applies it to the control device (34) as an actual delivery stroke signal. The actual delivery stroke signal is compared in the control device with a reference signal related to the desired start of delivery and with the desired delivery stroke signal calculated by the control computer (35) and generates a closing or opening signal for the switching valve (29) when there is agreement. In order to compensate for a drift of the stroke transmitter, a relativized actual delivery stroke signal is used for the comparison, in which the deviation of the measured maximum stroke from a geometric maximum stroke of the pump plunger (14) determined by the construction is taken into account.

7 Claims, 3 Drawing Sheets

FUEL INJECTION PUMP FOR INTERNAL COMBUSTION ENGINES

PRIOR ART

The invention is directed to a fuel injection pump system, for internal combustion engines, of the generic type which includes a distributor type fuel injection pump having an axially oscillating plunger delimiting a pump work space, an electrically controlled switching valve arranged between the pump work space and a low pressure space filled with fuel, and a computerized control device for controlling the switching valve.

In a distributor-type fuel injection pump which has already been suggested (German Patent Application P 37 21 352.0) the reference delivery stroke effecting the injection is determined as the angle of rotation $\phi_Q$ of the pump plunger which corresponds to this reference delivery stroke. Since the control device can only process times, but not angles of rotation, an angle-time system is provided with which the time $T_0$ required for the pump plunger to pass through a measurement window stretching over a preselected constant angle of rotation $\phi_0$ is measured. The closing period $T_Q$ during which the determined reference delivery stroke of the pump plunger is executed is then calculated with this measurement time $T_0$ and the constant angle of rotation $\phi_0$. The closing time is calculated according to $T_Q = T_0 \cdot \phi_Q / \phi_0$.

In order to keep metering errors resulting from speed changes between the time measurement and the actual metering as small as possible, the time measurement was applied as close as possible to the delivery stroke of the pump plunger effecting the injection and the time measurement window was stretched in the area of the bottom dead center position of the pump plunger. Nevertheless, erroneous metering due to speed changes between the area of the bottom dead center position and the delivery stroke area, which can be proved to occur, can not be avoided, which, in a positive feedback effect, results in a substantially deviating speed adjustment of the internal combustion engine.

In a known distributor-type fuel injection pump (U.S. Pat. No. 4,475,507), control marks are arranged so as to be distributed along the circumference of the pump plunger in the sequence of the pump plunger delivery strokes and cooperate, one after the other, with a stroke position transmitter. In this way, sequential signals are produced which characterize the bottom dead center position of the pump plunger prior to the commencement of its delivery stroke. The switching valve which controls the connection between the pump work space and the relief or low-pressure space is triggered and brought into the closing position by means of these control signals. With the aid of an angular segment transmitter, rotational angle segments are counted in sequence and compared with a reference angle until agreement prevails. After this point, the switching valve is opened again so that the injection is terminated. The reference angle is composed of a pre-stroke angle and an injection angle, both of which are measured from preselected parameters corresponding to a characteristic field. The disadvantage of this control of the switching valve consists in that an accurately manufactured segment wheel must be produced with perfect pulse recognition. In addition, the pulse train or minimum division in angular segments cannot be refined as desired at a reasonable cost, so that the metering accuracy of the fuel injection quantity is limited on the basis of this defined resolution.

ADVANTAGES OF THE INVENTION

The fuel injection pump, according to the invention, is characterized in that a stroke transmitter (36) is provided which determines the stroke path of the pump plunger (14) and transmits to the control device, as an actual delivery stroke signal, the delivery stroke covered by the pump plunger (14) starting from a reference point, in that the actual delivery stroke signal is compared in the control device (34) with a reference signal corresponding to a predetermined plunger stroke of the pump plunger and, on the other hand, with a desired delivery stroke signal determined from a stored characteristic field, and in that the control device (34) generates a closing signal for the switching valve (29) as soon as the actual delivery stroke signal is equal to the reference signal, and generates an opening signal for the switching valve (29) as soon as the actual delivery stroke signal is equal to the desired delivery stroke signal. The invention has the advantage that the commencement and end of delivery can be controlled directly by means of the reference delivery stroke of the pump plunger determined for a desired operating state of the internal combustion engine. A costly system for converting into other control variables is avoided. In contrast to the fuel injection pump with path-time system, the instantaneous rate of rotation of the internal combustion engine has no reactive effect on the metering. Neither the injection distributor, which is usually present, nor the drift of the fuel injection pump influence the metering of the fuel injection quantity. The commencement of delivery determined by the closing of the switching valve can be based on a preselected cam stroke in the area of the leading edge of the cam or prior to the beginning of the cam (stroke of the pump plunger equals zero). The end of delivery is caused by the opening of the switching valve as soon as the measured actual delivery stroke of the pump plunger agrees with the reference delivery stroke.

Advantageous developments and improvements of the fuel injection pump according to the invention make it possible that the stroke transmitter is "calibrated" in every stroke period, and a possible drifting and its temperature dependency are accordingly compensated for.

In the fuel injection pump, according to the invention, metering errors can result solely because of the constant switching times of the switching valve. Thus, a 2/2-way magnet valve, commonly used as a switching valve, comprises a switch-on delay time and a switch-off delay time in a known manner. The magnet valve also does not close and open in a sudden manner, rather a switch-on and switch-off flight time is to be taken into account for the valve element until the complete closing and opening. If the switching times of the magnet valve are stored, as a function of the rate of rotation of the pump plunger, in a so-called characteristic field as delivery strokes effecting the injection, stroke paths can be taken into account in the control of the switching valve.

DRAWING

The invention is explained in more detail in the following description by means of the embodiment example shown in the drawing, wherein FIG. 1 shows a longitudinal section of a fuel injection pump of the distributor type;

FIG. 2 shows diagrams of the time curve of the cam pitch curve (a) at the cam drive of the fuel injection pump according to FIG. 1, of the output signal (b) of a stroke transmitter, of the control voltage (c) at a magnet valve and at a control device of the fuel injection pump in FIG. 1, respectively, and of the movement stroke (d) of the valve element of the magnet valve, in section and assignment with respect to time;

FIGS. 3 and 4, respectively, show a block wiring diagram of the control device of the fuel injection pump in FIG. 1 according to a first and second embodiment example.

DESCRIPTION OF THE PREFERRED EMBODIMENTS

Figure 1:
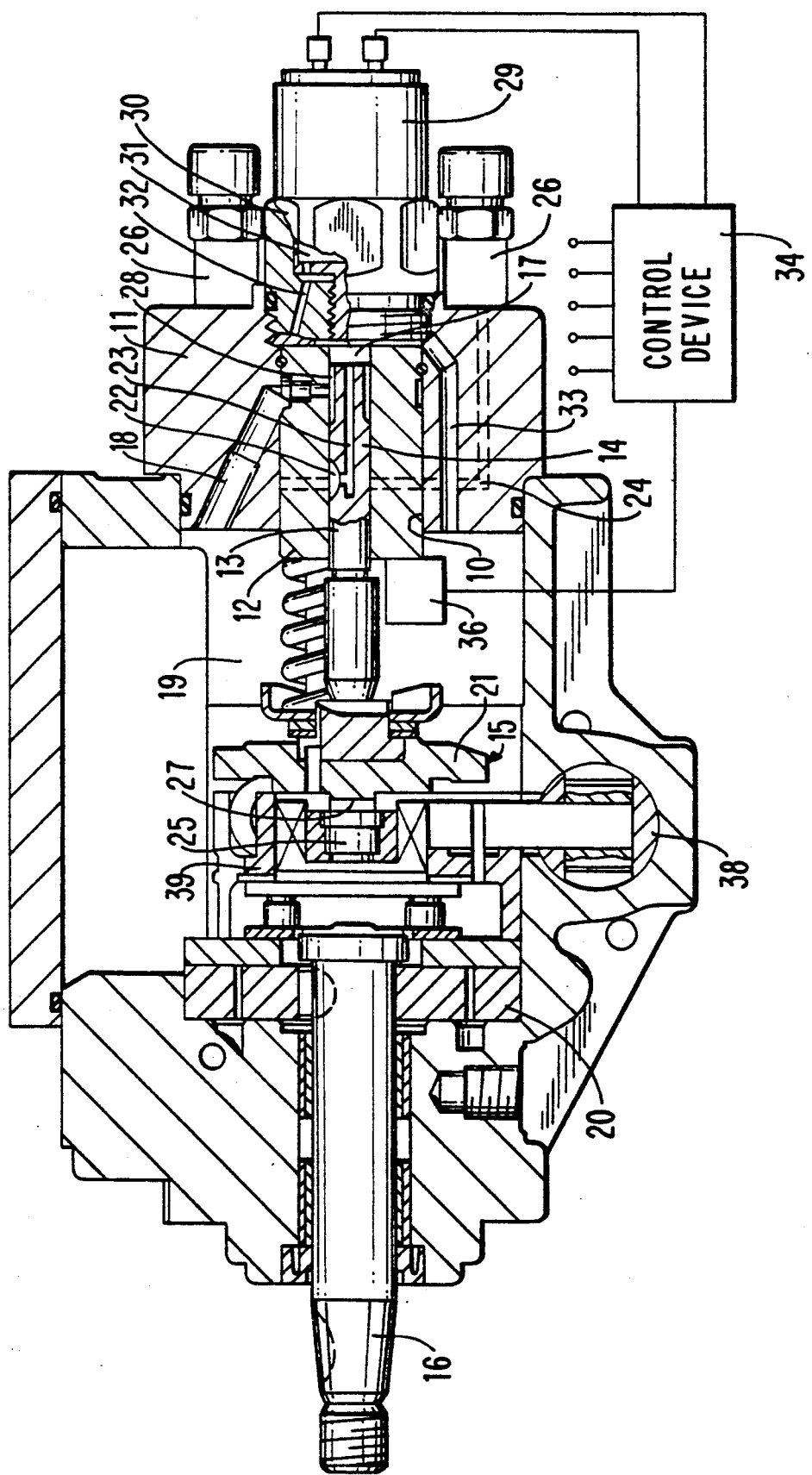

In the distributor-type fuel injection pump shown in longitudinal section in FIG. 1, a bushing 12 is arranged in a bore hole 10 of a housing 11, a pump plunger 14 executing a reciprocating and simultaneously rotating movement in a known manner in the cylinder bore hole 13 of the bushing 12. The pump plunger 14 is driven by means of a cam drive 15 via a shaft 16 which rotates so as to be synchronous with respect to the speed of the internal combustion engine supplied with fuel by the fuel injection pump. A pump work space 17 is defined by the end face of the pump plunger 14 and is connected, via a supply duct 18, with a fuel low-pressure space or suction space 19 in the housing 11 of the fuel injection pump. The suction space 19 is supplied with fuel via a delivery pump 20 which sits on the shaft 16 so as to be fixed with respect to rotation relative to it; the delivery pump 20 sucks the fuel out of a fuel reservoir, not shown. The fuel is distributed during corresponding rotation of the pump plunger 14 to pressure lines 24, shown in dashes, from the pump work space 17 via a distributor opening 22 which opens out at the circumference of the pump plunger 14 and which is continuously connected with the pump work space 17 via an axial duct 23. The pressure lines 24 lead to injection nozzles 26 of the internal combustion engine. The quantity of pressure lines 24 supplied by the distributor opening 22 corresponds to the number of the injection nozzles 26 of the internal combustion engine to be supplied. An identical number of cams 27 are provided in the cam drive 15. In the four-cylinder internal combustion engine, which is shown here as an example of an internal combustion engine and comprises one injection nozzle per combustion cylinder, there are a total of four pressure lines 24, four injection nozzles 26 and four cams 27 in the cam drive 15. The distance of the cams 27 in the cam drive 15 with respect to the angle of rotation is 90°. The cams 27 are arranged on the front side of a disk 21 which is connected with the pump plunger 14 so as to be fixed with respect to rotation relative to it and roll on rollers 25 of a roller ring 39 during the rotation of the disk 21, the roller ring 39 being mechanically connected with an injection distributor 38. In the end area of the pump plunger 14 facing the pump work space 17, longitudinal grooves 28 are provided at the circumference of the pump plunger 14 which open toward the end face and accordingly toward the pump work space 17, a connection being produced between the supply duct 18 and the pump work space 17 via these longitudinal grooves 28 during the suction stroke of the pump plunger 14.

Figure 2A:
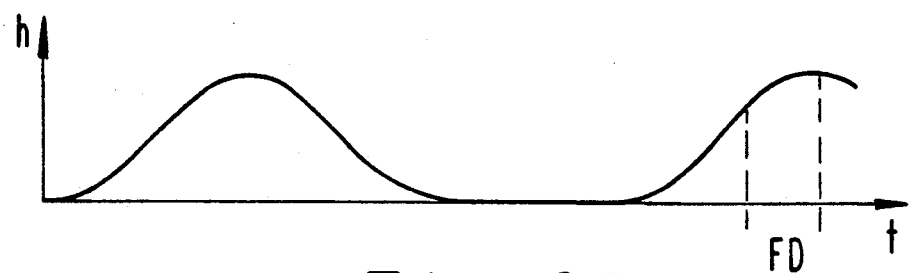
Figure 2B:
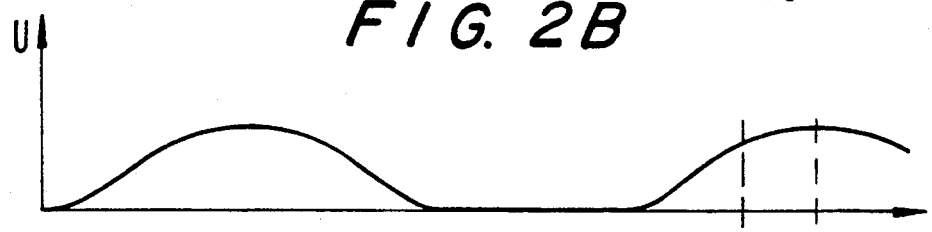

A switching valve 29 constructed as a 2/2-way magnet valve is screwed into the bore hole 10 opposite the bushing 12 and the end face of the pump plunger 14 defining the pump work space 17, so that the pump work space 17 is closed off from the valve housing 30. The valve space 31 of the switching valve 29 communicates with the pump work space 17 on the one hand via an inlet bore hole 32 and with a control bore hole 33 on the other hand via an outlet bore hole, not shown; the control bore hole 33 leads through the housing 11 until the suction space 19. Depending on the switching position of the switching valve 29, the pump work space 17 is accordingly hermetically closed or connected with the suction space 19. The switching valve 29 is designed in such a way that the connection to the suction space 19 is produced in the currentless rest position and the pump work space 17 is closed in the work position provided with current. The magnet valve 29 is controlled by a control device 34 which contains a control computer 3 which calculates the fuel injection quantity required for an optimal operation of the internal combustion engine as a function of the operating parameters of the internal combustion engine, such as speed, load, position of the accelerator pedal, temperature and the like. A determined fuel injection quantity requires a determined delivery stroke of the pump plunger 14 which is determined by the control computer 35 in view of the operating data supplied to it from the stored characteristic fields. A stroke transmitter 36 is arranged in the suction space 19 so as to be stationary and transmits the stroke path of the pump plunger 14 as an electric actual stroke signal. The stroke transmitter 36 senses the stroke path of the pump plunger 14 in a contactless manner, e.g. inductively or electromagnetically, and can be constructed as a Hall sensor, induction pickup, field-dependent plate or eddy current transmitter. The output signal of the stroke transmitter 36 shown in FIG. 2b is proportional to the stroke configuration and the cam pitch curve, as is shown in FIG. 2a. The output signal or actual stroke signal of the stroke transmitter 36 is supplied to the control device 34 and continuously compared in the latter, on the one hand, with a reference signal corresponding to a predetermined stroke of the pump plunger 14, which can also be zero, and on the other hand with the reference stroke signal supplied by the control computer 35. As soon as the actual stroke signal is equal to the reference signal, the control device 34 generates a closing signal for the switching valve 29, and as soon as the actual stroke signal is equal to the reference stroke signal the control computer 35 generates an opening signal for the switching valve 29. An exciting voltage (FIG. 2c) is applied to the exciting winding of the switching valve 29 with the closing signal. The exciting voltage ceases with the opening signal. The switching valve 29 is accordingly closed between the closing signal and the opening signal. As a result of the unavoidable switching times of a magnet valve, the switching valve 29 does not close and open in a sudden manner, but rather—as can be seen in FIG. 2d—with a certain delay.

The pump plunger 14 is rotated by means of the drive of the drive shaft 16 and executes a reciprocating pumping movement, in addition to the rotating movement, as a result of the rotating cams 27 rolling on the rollers 25 of the roller ring 39. If the pump plunger 14 is located on the trailing edge of the cam pitch curve (FIG. 2a), it executes a suction stroke in a known manner, in which the pump work space 17 is filled with fuel from the suction space 19. After passing through the bottom dead center position, the pump plunger 14 is driven in an upward stroke, the so-called delivery stroke, through the ascending cam curve of the following cam 27. During the closing time of the switching valve 29, the connection with the suction space 19 is interrupted. The fuel displaced by the pump plunger 14 is now delivered, via the distributor opening 22, into one of the pressure lines 24, with which the distributor opening 22 communicates corresponding to the rotational position of the pump plunger 14. As soon as the switching valve 29 is opened again, the high pressure in the pump work space 17 collapses and the remaining fuel delivered by the pump plunger 14 is pushed out into the suction space 19 via the opened switching valve 29 until reaching the top dead center position of the pump plunger 14. During the subsequent downward movement of the pump plunger 14, the pump work space 17 is again filled with fuel as described above. The delivery period is drawn in FIG. 2 and designated by FD.

In order to compensate for temperature influences on the actual stroke signal and for a drifting of the stroke transmitter 36, the actual stroke signal is applied to the maximum actual stroke of the pump plunger 14. This maximum actual stroke of the pump plunger is measured by the stroke transmitter 36 in the preceding stroke and stored in the control device 34. In particular, there are two possibilities for this which lead to the same result.

Figure 3:
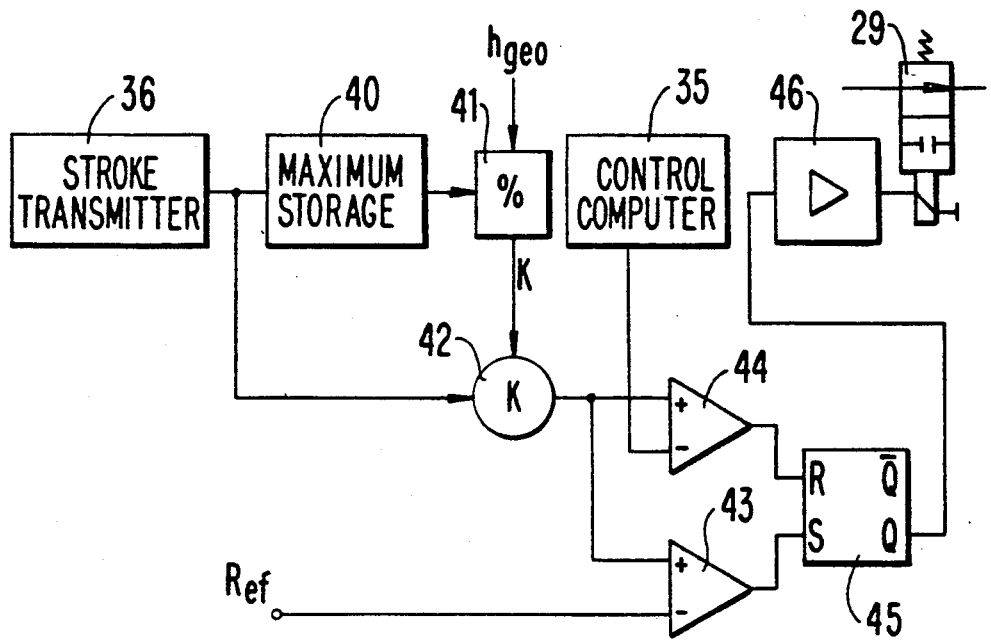

In the first embodiment example of the control device 34 shown in the block wiring diagram in FIG. 3, the actual stroke signal of the stroke transmitter 36 is supplied to a maximum storage 40 which stores the greatest actual stroke signal determined during the preceding pump plunger stroke. At the end of the following pump plunger stroke, this stored maximum signal $h_{max}$ is put in a ratio to the known geometric maximum stroke $h_{geo}$ of the pump plunger 14 in a ratio former 41, which geometric maximum stroke $h_{geo}$ is known because of the, construction information. Accordingly, a weighting factor $k = h_{geo}/h_{max}$ can be taken off at the output of the ratio former 41. This weighting factor k is fed to a weighting stage 42 in which the actual stroke signal transmitted by the stroke transmitter 36 is continuously weighted with the weighting factor k, i.e. multiplied in amplitude. The output of the weighting stage 42 is fed in each instance to the non-inverting input of a first and second comparator 43, 44. The output of the first comparator 43 is applied to the set input of a RS flip-flop 45 which is triggered by the pulse edge, while the output of the second comparator 44 is connected to the reset input of the RS flip-flop 45. The Q output of the RS flip-flop 45 is connected with the exciting winding of the switching valve 29 via an amplifier 46. The reference stroke signal determined by the control computer 35 is connected to the inverting input of the second comparator 44, while the inverting input of the first comparator 43 is occupied by a reference signal or threshold value which corresponds to a preselected stroke of the pump plunger 40 at which the delivery will commence. If the start of delivery is set at the start of the cam, this reference signal will be zero. During the pump plunger stroke, the weighted actual stroke signal at the output of the stroke transmitter 36 is continuously compared with the reference signal in the first comparator 43 and with the reference stroke signal in the second comparator 44. As soon as the weighted actual stroke signal reaches or exceeds the reference signal, the flip-flop 45 is set and high potential occurs at its Q output. The amplified high potential is applied to the switching valve 29 as exciting voltage and closes the latter. Fuel is now delivered from the pump work space 17 to the individual injection nozzles 26. As soon as the weighted actual stroke signal reaches or exceeds the reference stroke signal predetermined by the control computer 35, the output signal of the second comparator 44 jumps from low to high. This leading potential edge causes a resetting of the flip-flop 45, so that its Q output takes on low potential again and the magnet excitation of the switching valve 29 is canceled. The switching valve 29 opens under the action of a return spring. The fuel injection is terminated.

Figure 4:
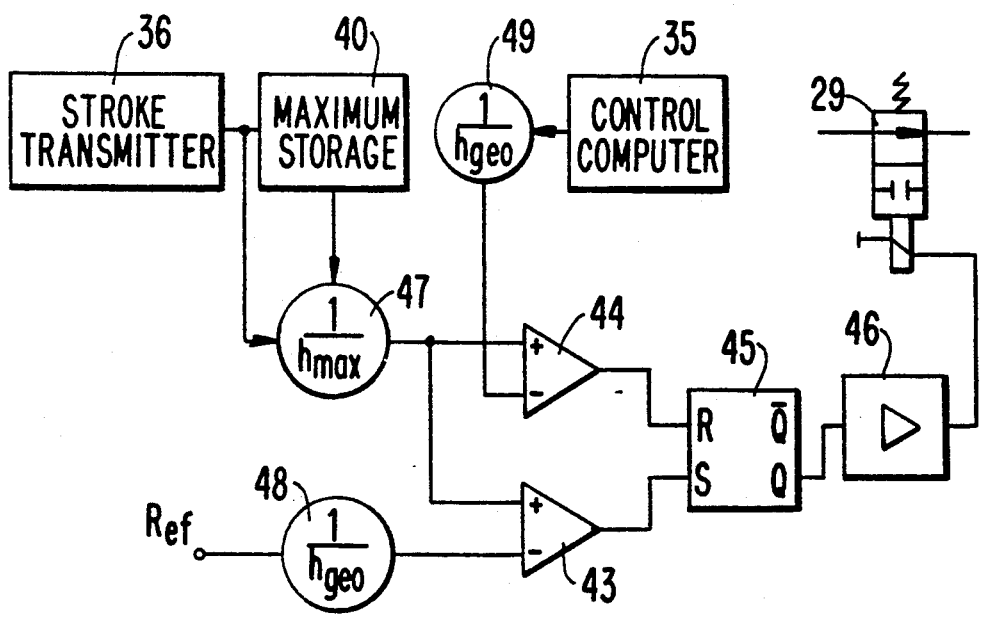

In the embodiment example of the control device 34 in FIG. 4, the actual stroke signal is again weighted with a first weighting factor prior to being applied to the non-inverting input of the two comparators 43, 44 in a weighting stage 47. This weighting factor is the reciprocal value of the maximum actual stroke $h_{max}$ of the pump plunger 14 measured by the stroke transmitter 36 in the preceding stroke and stored in the maximum storage 40. In addition, the reference signal and the reference stroke signal are likewise weighted in a weighting stage 48 and 49, respectively, with a second weighting factor. This weighting factor is the reciprocal value of the known geometric maximum stroke $h_{geo}$ of the pump plunger 14 on the basis of the given factors of its construction. All weighted signals are applied to the comparators 43 and 44 in the same manner as described in FIG. 3. Moreover, the control device 34 according to FIG. 4 agrees with the control device 34 in FIG. 3, so that identical circuit parts are provided with the same reference numbers. A drift of the stroke transmitter 36 is compensated for in both control devices 34 by means of the application of the maximum actual stroke measured by the stroke transmitter 36 during every pump plunger stroke to the geometric maximum stroke of the pump plunger 14 which is predetermined by the construction, so that no errors can occur in the metering of the fuel injection quantity because of this.

Figure 2C:
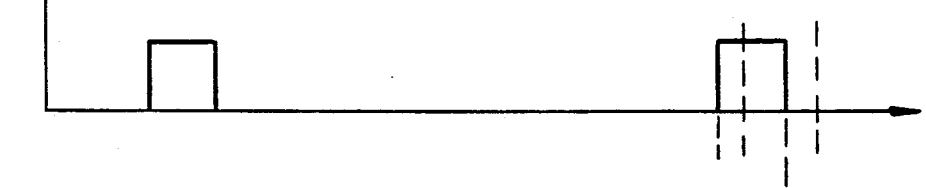
Figure 2D:
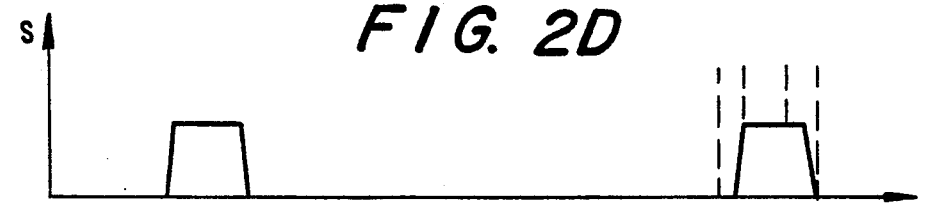

Some metering errors of relatively small magnitude occur because of the constant switching times of the switching valve 29, as can be seen in comparing the diagrams in FIG. 2c and FIG. 2d. Since the pump plunger speed is proportional to the speed of the internal combustion engine, the errors made in the metering as a result of the switching times of the switching valve 29 are much greater at high speeds than at low speeds. These errors can be prevented if these switching times are stored in so-called characteristic fields as stroke corrections as a function of the average speed of the internal combustion engine and these stroke corrections are taken into account in the comparison of the actual stroke signal with the reference signal on the one hand and with the reference stroke signal on the other hand. Since these characteristic fields are stored in the control computer 35 and the stroke corrections are determined by the control computer, these stroke corrections can be taken into account most simply by means of a corresponding correction of the reference stroke signal and the reference signal.

We claim:

1. Fuel injection pump system, particularly of the distributor type, for internal combustion engines, comprising a pump plunger delimiting a pump work space and being set at least in an axially oscillating motion, particularly by means of a cam drive, an electrically controlled switching valve arranged in a connection line between the pump, work space and a low-pressure space filled with fuel and being operated between two switching positions for opening and closing the connection line, whereby closing or blocking periods of the switching valve determine the start of delivery and the fuel delivery quantity arriving from the pump work space per pump plunger stroke for injection, a control device for controlling the switching valve, the control device including a control computer which calculates the desired delivery stroke of the pump plunger effecting injection as a function of operating parameters of the internal combustion engine, such as speed, load, temperature, accelerator pedal position and the like, particularly determines it from a stored characteristic field, and transmits it as a desired delivery stroke signal to the control device, a stroke transmitter (36) which detects the delivery stroke path of the pump plunger (14) starting from a reference point and transmits to the control device a corresponding actual delivery stroke signal, the control device (34) comparing the actual delivery stroke signal with a reference signal corresponding to a predetermined plunger stroke of the pump plunger and, with the desired delivery stroke signal, and the control device (34) generates a closing signal for the switching valve (29) as soon as the actual delivery stroke signal is equal to the desired delivery stroke signal, the actual delivery stroke signal being weighted with a correction factor (k) prior to the comparison in the control device, the correction factor (k) being calculated as a ratio of a predetermined geometric maximum stroke ($h_{geo}$) of the pump plunger (14) and of a measured maximum stroke ($h_{max}$) of the pump plunger (14) measured by the stroke transmitter (36) during the preceding stroke period, the control device (34) containing two comparators (43, 44) each having two inputs, one of the inputs being connected to the output of the stroke transmitter (36) via a weighting stage (42) whose wighting factor (k) is equal to the ratio of the predetermined geometric maximum stroke ($h_{geo}$) and the maximum stroke ($h_{max}$) of the pump plunger (14) measured by the stroke transmitter (36) in the immediately preceding stroke period, the other input of the first comparator (43) being supplied with the reference signal and the other input of the second comparator (44) is supplied with the desired delivery stroke signal, and in that the two comparators (43, 44) are constructed in such as way that they generate an output signal when their input signals are equal.

2. Fuel injection pump system, particularly of the distributor type, for internal combustion engines, comprising a pump plunger delimiting a pump work space and being set at least in an axially oscillating motion, particularly by means of a cam drive, an electrically controlled switching valve arranged in a connection line between the pump, work space and a low-pressure space filled with fuel and being operated between two switching positions for opening and closing the connection line, whereby closing or blocking periods of the switching valve determine the start of delivery and the fuel delivery quantity arriving from the pump work space per pump plunger stroke for injection, a control device for controlling the switching valve, the control device including a control computer which calculates the desired delivery stroke of the pump plunger effecting injection as a function of operating parameters of the internal combustion engine, such as speed, load, temperature, accelerator pedal position and the like, particularly determines it from a stored characteristic field, and transmits it as a desired delivery stroke signal to the control device, a stroke transmitter (36) which detects the delivery stroke path of the pump plunger (14) starting from a reference point and transmits to the control device a corresponding actual delivery stroke signal, the control device (34) comparing the actual delivery stroke signal with a reference signal corresponding to a predetermined plunger stroke of the pump plunger and, with the desired delivery stroke signal, and the control device (34) generates a closing signal for the switching valve (29) as soon as the actual delivery stroke signal is equal to the desired delivery stroke signal, the actual delivery stroke signal being related to the measured maximum stroke ($h_{max}$) of the pump plunger (14) measured by the stroke transmitter (36) in the preceding stroke period prior to the comparison, and the reference signal and the desired delivery stroke signal are related to the predetermined geometric maximum stroke ($h_{geo}$) of the pump plunger (14), the control device (34) containing two comparators (43, 44) each having two inputs, one of the inputs being connected to the output of the stroke transmitter (36) via a weighting stage (47) having a first weighting factor ($1/h_{max}$), the other input of the first comparator (43) being supplied with the reference signal weighted with a second weighting factor ($1/h_{geo}$), wherein the first weighting factor is the reciprocal valve of the measured maximum stroke ($h_{max}$) of the pump plunger (14) measured by the stroke transmitter (36) in the preceding stroke period and the second weighting factor is the reciprocal value of the geometric maximum stroke ($h_{geo}$) of the pump plunger (14) determined on the basis of construction, and both comparators (43, 44) being constructed in such a way that they generate an output signal when their input signals are equal.

3. Fuel injection pump system, particularly of the distributor type, for internal combustion engines, comprising a pump plunger delimiting a pump work space and being set at least in an axially oscillating motion, particularly by means of a cam drive, an electrically controlled switching valve arranged in a connection line between the pump, work space and a low-pressure spaced filled with fuel and being operated between two switching positions for opening and closing the connection line, whereby closing or blocking periods of the switching valve determine the start of delivery and the fuel delivery quantity arriving from the pump work space per pump plunger stroke for injection, a control device for controlling the switching valve, the control device including a control computer which calculates the desired delivery stroke of the pump plunger effecting injection as a function of operating parameters of the internal combustion engine, such as speed, load, temperature, accelerator pedal position and the like, particularly determines it from a stored characteristic field, and transmits it as a desired delivery stroke signal to the control device, a stroke transmitter (36) which detects the delivery stroke path of the pump plunger (14) starting from a reference point and transmits to the control device a corresponding actual delivery stroke signal, the control device (34) comparing the actual delivery stroke signal with a reference signal corresponding to a predetermined plunger stroke of the pump plunger and, with the desired delivery stroke signal, and the control device (34) generates a closing signal for the switching valve (29) as soon as the actual delivery stroke signal is equal to the desired delivery stroke signal.

4. Pump system according to claim 3, characterized in that the actual delivery stroke signal is weighted with a correction factor (k) prior to the comparison in the control device, and in that the correction factor (k) is calculated as a predetermined ratio of a geometric maximum stroke ($h_{geo}$) of the pump plunger (14) and of a measured maximum stroke ($h_{max}$) of the pump plunger (14) measured by the stroke transmitter (36) during the preceding stroke period.

5. Pump system according to claim 3, characterized in that the actual delivery stroke signal is related to the measured maximum stroke ($h_{max}$) of the pump plunger (14) measured by the stroke transmitter (36) in the preceding stroke period prior to the comparison, and the reference signal and the desired delivery stroke signal are related to the predetermined geometric maximum stroke ($h_{geo}$) of the pump plunger (14).

6. Pump system according to claim 3, characterized in that constant switching delay times of the switching valve (29) are stored in the characteristic field as stroke paths in relation to speeds of the internal combustion engine and are taken into account as correction values in determining the desired delivery stroke signal and the reference signal.

7. Pump system according to claim 3, characterized in that the stroke transmitter (36) senses the instantaneous position of the pump plunger (14) in a contactless manner.

* * * * *